3,389,126
PROCESS FOR THE PRODUCTION OF HIGH MOLECULAR WEIGHT POLYOXYMETHYLENE
Tadashi Yamaguchi, Sendai-shi, Shinichi Murayama, Musashino-shi, and Nobutaka Nakamura, Tokyo, Japan, assignors to Sumitomo Bakelite Company Limited, Chiyoda-ku, Japan, a corporation of Japan, and to Tadashi Yamaguchi, Sendai-shi, Japan
No Drawing. Filed Jan. 27, 1965, Ser. No. 428,559
Claims priority, application Japan, Feb. 5, 1964, 39/5,695
9 Claims. (Cl. 260—67)

ABSTRACT OF THE DISCLOSURE

A process for producing a high molecular weight polyoxymethylene having an intrinsic viscosity of at least 1.0 as measured at 60° C. in p-chlorophenol containing 2% of α-pinene which comprises introducing formaldehyde into a mixed solvent consisting of 100 parts of a saturated aliphatic hydrocarbon having 3 to 12 carbon atoms and 0.1 to 100 parts of liquid sulfur dioxide with or without an acidic catalyst.

---

This invention relates to a method for the production of high molecular weight polyoxymethylene by polymerizing gaseous formaldehyde in the presence or absence of acidic polymerization catalyst using saturated hydrocarbon containing liquid sulfur dioxide.

The methods for the production of polyoxymethylene have been made mention of in the early works such as "Die Hochmolekularen Organischen Verbindungen" (Julius Springer, Berlin, 1932) by H. Staudinger and "Formaldehyde" (Reinhold Publishing Corp., New York, 1944) by J. F. Walker. According to the methods mentioned in above works, α-, β- or γ-polyoxymethylene is produced in the presence of acidic catalyst as well as of water and each has relatively low degree of polymerization of less than 500. The above polyoxymethylenes also do not have good thermal stability and it is difficult, for example, to produce those having the thermal decomposition rate of less than 20% by weight per minute at the temperature of 222° C.

Although formaldehyde polymer shown in U.S. Patent No. 2,915,560, dated Dec. 1, 1959, is produced in the presence of sulfur dioxide, the resulting product contains less than 50 p.p.m. of sulfur and the formaldehyde content thereof is 97 to 99% by weight. It has the sublimation loss of 7.8% by weight in a day at the temperature of 150° F. and has poor thermal stability. The degree of polymerization is less than 60, calculated from the formaldehyde content by the following equation;

$$\text{formaldehyde content } (\%) = \frac{30n}{18+30n} \times 100$$

wherein $n$ is the degree of polymerization, above polymer having the structural formula:

$$H(OCH_2)_nOH$$

wherein $n$ is the same as defined above, and the intrinsic viscosity in p-chlorophenol containing 2% by weight of α-pinene at the temperature of 60° C. (the term "intrinsic viscosity" is only used hereinafter without indicating conditions used) can not be measured.

Formaldehyde polymer described in above Patent is included in the class of low molecular weight polyoxymethylene, representative of which is α-polyoxymethylene, according to the classification by Walker's book and can not be used as a so-called plastic. It is well known that the polymerization of formaldehyde is carried out by means of water in a controlled amount, and acidic catalysts such as Lewis acids or basic catalysts such as amines and the like, and that many reports have recently been made on the method for the production of high molecular weight polyoxymethylene which can be utilized as a plastic. It is also known that, according to said method, substantially anhydrous formaldehyde of high purity is polymerized by using catalysts such as tertiary or quaternary nitrogen bases, metal salts, metal alcoholates, organometallic compounds, sulfonium salts and phosphonium salts. However there is mentioned in above reports that when such catalysts are employed, the polymerization is required to be carried out in the so-called "substantially anhydrous" state wherein the existence of water is avoided as much as possible whatever the case may be. In order to make formaldehyde in the so-called "substantially anhydrous" state, some treatment processes for refining said formaldehyde which cost dearly are necessary, so that above methods have many disadvantages when put into practice commercially. Furthermore, it is very difficult to polymerize formaldehyde to produce higher molecular weight polyoxymethylene when acidic catalysts are used. For example, when the polymerization of the formaldehyde is carried out in toluene using $BF_3 \cdot O(C_2H_5)_2$ catalyst, the resulting polymer has the intrinsic viscosity $[\eta]$ of only 0.2 to 0.3 at the best and the degree of polymerization of less than 500, showing no toughness when moulded into a film.

The object of this invention is to produce high molecular weight polyoxymethylene having the intrinsic viscosity of at least more than 1.0 as measured in p-chlorophenol containing 2% by weight of α-pinene at the temperature of 60° C.

Another object of this invention is to produce high molecular weight polyoxymethylene have high intrinsic viscosity and better properties in high yields using formaldehyde of lower degree of purification, that is to say, whether more or less water is present in said formaldehyde.

The inventors have found that high molecular weight polyoxymethylene having the intrinsic viscosity of at least more than 1.0 is ready to be obtained when the polymerization of formaldehyde is carried out in particular saturated hydrocarbon containing sulfur dioxide in the presence or absence of acidic catalyst. They also have found that in the above case the polymerization is possible even without complete purification of formaldehyde.

This invention relates to the method for the production of high molecular weight polyoxymethylene having the intrinsic viscosity of at least more than 1.0 wherein gaseous formaldehyde is contacted with a mixture consisting of liquid saturated hydrocarbon, being selected from the group consisting of saturated aliphatic hydrocarbons and saturated cycloaliphatic hydrocarbons having 3 to 12 carbon atoms per molecule, and liquid sulfur dioxide in amounts from 0.1 to 100 parts by volume based on 100 parts by volume of said saturated hydrocarbon in the presence or absence of acidic catalyst.

Saturated aliphatic hydrocarbon used in the practice of this invention is that having 3 to 12 carbon atoms per molecule such as propane, butane, pentane, hexane, heptane, octane, nonane, decane, undecane or dodecane. Saturated cycloaliphatic hydrocarbon used in the practice of this invention is that having 3 to 12 carbon atoms per molecule such as cyclobutane, cryclopentane. As acidic catalysts, there are Lewis acids such as $AlCl_3$, $BF_3$, $BF_3 \cdot O(C_2H_5)_2$, $FeCl_3$, $SbCl_5$, $SnCl_4$, $TiCl_4$ and the like and hydro-acids such as hydrogen chloride, $ClSO_3H$, $$p\text{-}CH_3 \cdot C_6H_4 \cdot SO_3H$$

and the like.

In the practical procedure generally used according to the present invention, gaseous formaldehyde produced by thermal decomposition of formaldehyde polymer such as paraformaldehyde, α-, β-, γ- or δ-polyoxymethylene or the like is purified to the extent required through a trap and introduced continuously into the mixture of liquid saturated hydrocarbon and liquid sulfur dioxide in the presence or absence of acidic catalyst with stirring to cause the polymerization of formaldehyde. The temperature of this reaction system may be in the range from −80° to −10° C. under atmospheric pressure. If said formaldehyde is polymerized under increased pressure, the temperature range used can be extended more widely. As the polymerization reaction proceeds, there is precipitated white polyoxymethylene.

Though the proportion of sulfur dioxide to saturated hydrocarbon in the method of this invention may differ depending upon the polymerization temperature, saturated hydrocarbon used and the purity of formaldehyde used, 0.1 to 100 parts by volume of sulfur dioxide per 100 parts by volume of saturated hydrocarbon, preferably 0.5 to 25 parts by volume of sulfur dioxide per 100 parts by volume of saturated hydrocarbon are used. If the proportion of sulfur dioxide is less than 0.1 part by volume, the resulting product having low intrinsic viscosity is only obtained with low yield. When gaseous formaldehyde of relatively low purity is used, better result will be obtained if the proportion of sulfur dioxide is increased.

Though hydrocarbon and sulfur dioxide are present in the state of mixture, sulfur dioxide is dissolved in hydrocarbon to a certain extent and for example 0.2, 1.1, 2.0, 3.0 and 4.7 parts by volume of sulfur dioxide may be dissolved in 100 parts by volume of n-heptane at the temperature of −70, −60, −50, −40 and −20° C. respectively. Of course, the method according to this invention may be carried out in any of the systems, that is to say, both systems in the state of hydrocarbon solution wherein sulfur dioxide is dissolved and in the state of suspension wherein hydrocarbon and sulfur dioxide are mixed.

In the method of this invention, it is also possible to employ acidic catalysts and they can usually be used in amounts from 0.00001 to 0.1 mole per litre of reaction medium and the resulting product will be obtained in the state of good slurry.

According to the present invention, high molecular weight polyoxymethylene having the intrinsic viscosity of at least more than 1.0 and containing no sulfur can be obtained which can be utilized evidently as a plastic and differs from low molecular weight polyoxymethylene classified by Walker's works as above described. Polyoxymethylene according to the present invention can be moulded to form a film and has itself better thermal and moulding properties and toughness. Moreover, further good result will be obtained if polyoxymethylene of this invention is subjected to stabilizing treatment.

A remarkable feature of this invention is that the gaseous formaldehyde need not be purified so severely. Therefore this invention has considerable advantages commerically. In U.S. Patent No. 2,768,994, for instance, gaseous formaldehyde produced by thermal decomposition of α-polyoxymethylene having the formaldehyde content of 99.4% by weight, preferably at least 99.9% by weight as a formaldehyde source was required to be passed through a cooled refining trap while, in the present invention, high molecular weight polyoxymethylene of sufficiently good quality can be obtained by only passing gaseous formaldehyde produced by thermal decomposition of α-polyoxymethylene having the formaldehyde content of 99.4% by weight through a refining trap at room temperature as illustrated in Examples 15 and 16 hereinafter.

To speak of a further feature of this invention, excellent high molecular weight polyoxymethylene can be obtained by merely contacting gaseous formaldehyde with liquid saturated hydrocarbon containing sulfur dioxide and in particular it can be attained with a special combination of sulfur dioxide and particular saturated hydrocarbon. Good result will not be obtained when such a hydrocarbon as to form π-complex with sulfur dioxide is used. For example, solid polyoxymethylene can not be obtained with a combination of toluene and sulfur dioxide in the absence of acidic catalyst. Moreover, even if gaseous formaldehyde is contacted with the system consisting of toluene, sulfur dioxide and acidic catalyst, only a product having an intrinsic viscosity of 0.2 to 0.3 at the best will be obtained. Even when a mixture of sulfur dioxide with one of ethers such as diethylene ether and one of halogenated hydrocarbons such as methylene chloride is used, the result is about the same as in the case wherein the mixture of toluene and sulfur dioxide is used. Furthermore, when gaseous formaldehyde is contacted with only liquid sulfur dioxide without using saturated hydrocarbon at the same time, the intrinsic viscosity of the resulting polyoxymethylene will be 0.2 to 0.3 at the best and there will be obtained no product as well which can be of practical use.

To speak of still another feature of this invention, according to the method of the present invention, excellent high molecular weight polyoxymethylene can be obtained by employing acidic catalysts which, in conventional methods, can be used as polymerization catalysts for formaldehyde, but can not be used as catalysts for obtaining said high molecular weight polyoxymethylene that can be utilized as a plastic. Of course, high molecular weight polyoxymethylene can be obtained either with or without acidic catalysts, but, when said catalysts are employed, the resulting products will be obtained in the state of very superior slurry.

As above mentioned, according to this invention, high molecular weight polyoxymethylene can be obtained having the intrinsic viscosity of at least more than 1.0 with excellent properties by using sulfur dioxide, that is to say, by using a specific combination consisting of a mixture of sulfur dioxide and saturated hydrocarbon, so that the present method has considerable advantages commercially that complete purification of formaldehyde need not be effected.

The method of this invention is further illustrated in the following examples.

Example 1

Into a 4-necked 2l-flask equipped with gas inlet, gas outlet, thermometer and stirrer, were charged 50 parts by volume of liquid sulfur dioxide and 1,000 parts by volume of n-heptane. Formaldehyde produced by thermal decomposition of α-polyoxymethylene was passed through two traps at the temperature of −15° C. and introduced through the gas inlet into said 4-necked flask at the temperature of −70° C. and polymerized with stirring for a period of 30 minutes. The resulting polymer was separated from reaction mixture by filtration and washed with methanol and dried at the temperature of 60° C. for a period of five hours under reduced pressure to obtain white polymer with the yield of 88% by weight based on the amount of formaldehyde introduced. This polymer contained no sulfur as determined by chemical analysis and was proved to be polyoxymethylene by infrared spectrum analysis. The intrinsic viscosity of this polymer was 1.95 as measured with p-chlorophenol containing 2% by weight of α-pinene at the temperature of 60° C. The thermal decomposition rate was 6.56% per minute at the temperature of 222° C. as the primary decomposition rate constant. This polymer could be pressed to form a film and showed good toughness.

Example 2

Into a 4-necked 2-flask equipped with gas inlet, gas outlet having reflux condenser, thermometer and stirrer, were charged 15 parts by volume sulfur dioxide and 1,000 parts by volume of propane. Gaseous formaldehyde produced by the same procedure in Example 1 was introduced thereinto at the temperature of −42° C., boiling point of propane, to obtain white polymer having the intrinsic viscosity of 1.60 with the yield of 75%.

Example 3

To the system of liquid sulfur dioxide and n-heptane of Example 1 was added 1 cc. ($7.92 \times 10^{-3}$ moles) of $BF_3 \cdot O(C_2H_5)_2$ and then formaldehyde was introduced thereinto at the temperature of −70° C. to obtain white polymer having the intrinsic viscosity of 1.21 as measured in p-chlorophenol with the yield of 70% by weight based on the amount of formaldehyde introduced. This polymer could be pressed to form a film.

By way of comparison, when no sulfur dioxide was contained in the system, the intrinsic viscosity of the resulting polymer was 0.35.

Example 4

A mixture of 1,000 parts by volume of n-heptane and 27.5 parts by volume of liquid sulfur dioxide containing 422 mg. ($2.90 \times 10^{-3}$ moles) of $BF_3 \cdot O(C_2H_5)_2$ was contacted with gaseous formaldehyde produced by thermal decomposition of α-polyoxymethylene to obtain polymer with the yield of 74.2% by weight based on the thermally decomposed α-polyoxymethylene. The intrinsic viscosity of this polymer was 1.92.

Example 5

Example 4 was repeated except that 105 mg. ($7.39 \times 10^{-4}$ moles) of $BF_3 \cdot O(C_2H_5)_2$ were used to obtain polymer having the intrinsic viscosity of 1.98 with the yield of 62.8% by weight based on the thermally decomposed α-polyoxymethylene.

Example 6

Example 3 was repeated except that $2.17 \times 10^{-3}$ moles of $SnCl_4$ were added thereto instead of the $BF_3 \cdot O(C_2H_5)_2$ catalyst. When formaldehyde was introduced at the temperature of −70° C., there was obtained white polymer having the intrinsic viscosity of 1.47 with the yield of 75% by weight. In the case where sulfur dioxide was not present at the same time, the intrinsic viscosity of the resulting polymer was 0.38.

Example 7

A mixture of 15 parts by volume of liquid sulfur dioxide and 600 parts by volumn of n-hexane containing 0.5 g. ($4.28 \times 10^{-3}$ moles) of $ClSO_3H$ was contacted at the temperature of −60° C. with gaseous formaldehyde produced by thermal decomposition of α-polyoxymethylene to obtain polymer with the yield of 62%. The intrinsic viscosity of this polymer was 1.82.

Example 8

A mixture of 15 parts by volume of liquid sulfur dioxide and 800 parts by volume of cyclobutane was contacted at the temperature of −70° C. with gaseous formaldehyde produced by the decomposition of α-polyoxymethylene to obtain white polymer having intrinsic viscosity of 1.45 with the yield of 68%.

Examples 9 to 13

When the polymerization temperature and the amount of sulfur dioxide were varied in Example 1, the results obtained were shown in the following table.

TABLE 1

| Ex. | Polymerization temperature, ° C. | Amount of liquid sulfur dioxide (parts by volume) | Percent yield of resulting polymer | Intrinsic viscosity |
|---|---|---|---|---|
| 1 | −70 | 50 | 85 | 1.95 |
| 9 | −60 | 50 | 78 | 2.42 |
| 10 | −60 | 10 | 60 | 1.66 |
| 11 | −60 | 5 | 55 | 1.68 |
| 12 | −40 | 50 | 71 | 1.50 |
| 13 | −40 | 30 | 71 | 1.49 |

Example 14

To the mixture of liquid sulfur dioxide and n-heptane of Example 7, were added 4 parts by volume of water and then gaseous formaldehyde was introduced thereinto to obtain white polymer having the intrinsic viscosity of 1.64 with the yield of 80% based on the formaldehyde introduced.

When no sulfur dioxide was present in above method, the resulting polymer having the intrinsic viscosity of 0.13 was only obtained with the yield of 2.2% by weight.

Example 15

Into a reaction flask, were charged 50 parts by volume of liquid sulfur dioxide and 1,000 parts by volume of n-heptane. Gaseous formaldehyde produced by thermal decomposition of α-polyoxymethylene was only passed through a trap at the room temperature and this formaldehyde gas of relatively low purity was introduced into said flask at −70° C. to obtain polymer which could be moulded and had the intrinsic viscosity of 1.00 with the yield of 75% by weight.

Example 16

When liquid sulfur dioxide was increased up to 200 parts by volume in Example 15, white polymer was obtained with the yield of 78% by weight based on the formaldehyde introduced. The intrinsic viscosity of this polymer was 1.49. Thus, in the case of using relatively low purified formaldehyde, [η] of the resulting polymer could be increased by increasing the amount of sulfur dioxide used.

Example 17

In Example 16, 1 cc. ($7.9 \times 10^{-3}$ moles) of $$BF_3 \cdot O(C_2H_5)_2$$

was added to the mixture of liquid sulfur dioxide and n-heptane and then formaldehyde of relatively low purity was introduced thereinto at the temperature of −60° C. in the same manner as in Example 15 to obtain white polymer with the yield of 82% by weight. The intrinsic viscosity of this polymer was 1.43. When formaldehyde was polymerized in the system wherein no sulfur dioxide was present, the intrinsic viscosity of the resulting polymer was less than 0.1.

What is claimed is:
1. A method for the production of high molecular weight polyoxymethylene having an intrinsic viscosity of at least more than 1.0 as measured in p-chlorophenol containing 2% by weight of α-pinene at the temperature of 60° C., which method comprises contacting gaseous formaldehyde with a mixture consisting essentially of liquid saturated hydrocarbon, being selected from the group consisting of saturated aliphatic hydrocarbons and saturated cycloaliphatic hydrocarbons having 3 to 12 carbon atoms per molecule, and liquid sulfur dioxide wherein said liquid sulfur dioxide is present in amounts from 0.1 to 100 parts by volume based on 100 parts by volume of said saturated hydrocarbon.

2. A method for the production of high molecular weight polyoxymethylene having an intrinsic viscosity of at least more than 1.0 as measured in p-chlorophenol containing 2% by weight of α-pinene at the temperature of 60° C., which method comprises contacting gaseous formaldehyde with a mixture consisting essentially of liquid saturated hydrocarbon, being selected from the group consisting of saturated aliphatic hydrocarbons and saturated cycloaliphatic hydrocarbons having 3 to 12 carbon atoms, and liquid sulfur dioxide wherein said liquid sulfur dioxide is present in amounts from 0.1 to 100 parts by volume based on 100 parts by volume of said saturated hydrocarbon, in the presence of acidic catalyst in amounts from 0.00001 to 0.1 mol per litre of reaction medium.

3. A method according to claim 1 wherein the saturated hydrocarbon is n-heptane.

4. A method according to claim 2 wherein the saturated hydrocarbon is n-heptane.

5. A method according to claim 1 wherein said liquid sulfur dioxide is present in proportions from 0.5 to 25 parts by volume based on 100 parts by volume of said aliphatic hydrocarbons.

6. A method according to claim 2 wherein said liquid sulfur dioxide is present in proportions from 0.5 to 25 parts by volume based on 100 parts by volume of said saturated hydrocarbon.

7. A method according to claim 2 wherein the acidic catalyis $BF_3 \cdot O(C_2H_5)_2$.

8. A method according to claim 2 wherein the acidic catalyst is $SnCl_4$.

9. A method according to claim 2 wherein the acidic catalyst is $ClSO_3H$.

References Cited

UNITED STATES PATENTS

| 2,909,492 | 10/1959 | Schilling | 260—20 X |
| 3,027,352 | 3/1962 | Walling et al. | |
| 3,293,217 | 12/1966 | Amagasa et al. | |
| 3,297,642 | 1/1967 | Richtzenhain et al. | |

OTHER REFERENCES

Kern et al., English Translation of Angewandte Chemie, vol. 73, No. 6, Mar. 21, 1961, pp. 177–186 (pp. 6–13 relied upon).

WILLIAM H. SHORT, *Primary Examiner.*

L. M. PHYNES, *Assistant Examiner.*